(12) United States Patent
Gravina et al.

(10) Patent No.: US 10,663,054 B2
(45) Date of Patent: May 26, 2020

(54) OIL TRANSFER UNIT FOR TRANSFERRING OIL BETWEEN A STATIONARY PART AND A ROTATING PART

(71) Applicant: GE Avio S.r.l., Rivalta di Torino (IT)

(72) Inventors: Michele Gravina, Minervino Murge (IT); Federico Dellavalle, Pinerolo (IT)

(73) Assignee: GE Avio S.r.l, Rivalta di Torino (IT)

( * ) Notice: Subject to any disclaimer, the term of this patent is extended or adjusted under 35 U.S.C. 154(b) by 292 days.

(21) Appl. No.: 15/492,046

(22) Filed: Apr. 20, 2017

(65) Prior Publication Data

US 2017/0307063 A1 Oct. 26, 2017

(30) Foreign Application Priority Data

Apr. 20, 2016 (IT) .................... 102016000040492

(51) Int. Cl.
*F16H 57/04* (2010.01)
*F01D 25/18* (2006.01)
(Continued)

(52) U.S. Cl.
CPC ....... *F16H 57/0424* (2013.01); *F01D 25/164* (2013.01); *F01D 25/18* (2013.01);
(Continued)

(58) Field of Classification Search
CPC .... F16H 57/0424; F16H 1/28; F16H 57/0427; F16H 57/0479; F16H 57/0486;
(Continued)

(56) References Cited

U.S. PATENT DOCUMENTS 2,948,554 A * 8/1960 Mahand ............... F16J 15/3448
277/368
3,021,146 A * 2/1962 Sommer .................. F16J 15/54
277/368
(Continued)

FOREIGN PATENT DOCUMENTS

EP           2441923 A2    4/2012
WO    2015026600 A1    2/2015
WO    2015052409 A1    4/2015

OTHER PUBLICATIONS

Italian Search Report issued in connection with corresponding Italian application No. 102016000040492 dated Jan. 9, 2017.

*Primary Examiner* — Michael A Riegelman
(74) *Attorney, Agent, or Firm* — Dority & Manning, P.A.

(57) ABSTRACT

An oil transfer unit has a rotating part extending along an axis, a stationary part provided with an oil mouth, and a floating part having a cylindrical surface fitted onto an outer cylindrical surface of the rotating part in a non-contact configuration; an annular groove is provided between the floating part and the rotating part to put the oil mouth into communication with an inner chamber of the rotating part; both sides of the groove are sealed by a hydrostatic seal defined by a radial gap between the cylindrical surfaces; the unit has at least one oil transfer tube, coupled to the stationary part and the floating part in a fluid-tight manner and with freedom of movement, and a connecting rod to prevent rotation of the floating part; the opposite ends of the connecting rod are coupled to the stationary part and floating part by respective spherical joints.

16 Claims, 5 Drawing Sheets

(51) Int. Cl.
*F01D 25/16* (2006.01)
*F02C 7/36* (2006.01)
*F16H 1/28* (2006.01)
*F16H 57/08* (2006.01)
*F01D 15/12* (2006.01)

(52) U.S. Cl.
CPC ............... *F02C 7/36* (2013.01); *F16H 1/28* (2013.01); *F16H 57/0427* (2013.01); *F16H 57/0479* (2013.01); *F16H 57/0486* (2013.01); *F16H 57/082* (2013.01); *F01D 15/12* (2013.01); *F05D 2220/324* (2013.01); *F05D 2260/40311* (2013.01)

(58) Field of Classification Search
CPC ...... F16H 57/082; F01D 25/164; F01D 25/18; F01D 15/12; F02C 7/36; F16C 33/6659; F05D 2220/324; F05D 2260/40311
See application file for complete search history.

(56) References Cited

U.S. PATENT DOCUMENTS

| | | | | |
|---|---|---|---|---|
| 3,722,967 A * | 3/1973 | Lewis | ................... | F16C 19/26 384/466 |
| 3,756,095 A * | 9/1973 | McCay, Jr. | .......... | B60K 17/046 180/372 |
| 4,343,378 A * | 8/1982 | Bremer | ............... | F16C 33/6659 139/1 R |
| 4,370,106 A * | 1/1983 | Lauterbach | ............ | F01D 25/16 384/126 |
| 5,058,452 A * | 10/1991 | El-Shafei | .............. | F01D 25/164 464/180 |
| 5,201,585 A * | 4/1993 | Gans | .................... | F01D 25/164 384/215 |
| 5,797,684 A * | 8/1998 | Becker | ................. | F01D 25/164 384/99 |
| 5,803,708 A * | 9/1998 | Mouri | .................. | F01D 25/164 415/104 |
| 6,220,829 B1 * | 4/2001 | Thompson | ........... | F01D 25/164 417/407 |
| 8,484,942 B1 * | 7/2013 | McCune | ................. | F01D 25/18 184/6.12 |
| 9,732,839 B2 * | 8/2017 | Sheridan | ................... | F02C 7/36 |
| 9,896,969 B2 * | 2/2018 | Sheridan | ................ | F01D 11/02 |
| 10,066,734 B2 * | 9/2018 | Sheridan | ............ | F16H 57/0486 |
| 2008/0044276 A1 * | 2/2008 | McCune | ................. | F01D 5/027 415/122.1 |
| 2011/0058759 A1 * | 3/2011 | Herborth | ............... | F01D 25/164 384/55 |
| 2012/0088624 A1 * | 4/2012 | Sheridan | ................. | F01D 25/16 475/159 |
| 2012/0192570 A1 * | 8/2012 | McCune | ................. | F01D 25/18 60/792 |
| 2012/0308365 A1 * | 12/2012 | Woollenweber | ........ | F01D 25/16 415/170.1 |
| 2013/0014513 A1 * | 1/2013 | Barnett | ..................... | F02C 7/06 60/772 |
| 2013/0172144 A1 * | 7/2013 | Suzuki | ................ | F16H 57/0431 475/159 |
| 2013/0184120 A1 * | 7/2013 | Altamura | .............. | F16H 1/2836 475/346 |
| 2013/0331223 A1 * | 12/2013 | McCune | ................. | F16H 57/028 475/346 |
| 2015/0252852 A1 * | 9/2015 | Krause | .................. | F16C 33/664 384/465 |
| 2016/0201509 A1 * | 7/2016 | Sheridan | ................ | F01D 25/18 475/159 |
| 2016/0215871 A1 * | 7/2016 | Brault | .................... | F16H 57/042 |
| 2016/0245116 A1 * | 8/2016 | Belmonte | ................ | F02C 7/06 |
| 2016/0369652 A1 * | 12/2016 | Morris | ................... | F01D 25/18 |
| 2017/0114831 A1 * | 4/2017 | Snow | .................... | F01D 25/162 |
| 2017/0152760 A1 * | 6/2017 | Tompkins | ............... | F01D 25/18 |
| 2017/0292405 A1 * | 10/2017 | Isogai | ................. | F16C 33/6685 |
| 2017/0298769 A1 * | 10/2017 | Isogai | ................. | F01D 25/16 |
| 2017/0307061 A1 * | 10/2017 | Gravina | .................... | F02C 7/36 |
| 2017/0307062 A1 * | 10/2017 | Cipolla | .................... | F02C 7/36 |
| 2017/0307063 A1 * | 10/2017 | Gravina | ................ | F01D 25/164 |
| 2017/0335717 A1 * | 11/2017 | Isogai | ................... | F01D 25/164 |
| 2017/0350273 A1 * | 12/2017 | Gysling | ................ | F01D 25/164 |
| 2018/0030854 A1 * | 2/2018 | Flouros | ................. | F01D 25/125 |
| 2018/0216489 A1 * | 8/2018 | Curlier | .................... | F01D 25/18 |
| 2018/0306061 A1 * | 10/2018 | Husband | ............... | F01D 25/164 |

* cited by examiner

OIL TRANSFER UNIT FOR TRANSFERRING OIL BETWEEN A STATIONARY PART AND A ROTATING PART

BACKGROUND

The present invention relates to an oil transfer unit for transferring oil between a stationary part and a rotating part. In particular, the following description will refer to an oil transfer unit for supplying lubricating oil to a rotating planet carrier of an epicyclic transmission in a turbine engine, but without losing in generality because of this explicit reference.

As is known, an epicyclic transmission comprises a sun gear, a ring gear and a plurality of planet gears, which are located between the sun gear and the ring gear and are supported by a carrier. A transmission of such a type is capable of transmitting the motion between coaxial shafts rotating at different speeds, and is very effective in providing such a function while maintaining small weight and volumes. Epicyclic transmissions are widely used in aeronautical turbine engines, to drive a fan (in so-called turbo-fan engines) or a propeller (in so-called turbo-propeller engines).

In most applications, the carrier is of static type and is coupled to a fixed frame of the engine by a flexible element. Under these conditions, the components supported by the carrier (the planet gears, possible rolling bearings, etc.) are lubricated without particular difficulty via ducts which are fixed with respect to the engine frame and to the carrier.

On the other hand, certain applications employ a rotating carrier, by way of example when the carrier is connected to a rotating driven shaft or when there is a need to continuously control the speed ratio between the sun gear and the ring gear or, alternatively, between the carrier and the ring gear. In particular, the configuration of the epicyclic transmission is called "planetary" when the ring gear is stationary and the carrier is rotating, and "differential" when all three elements, i.e. sun gear, ring gear and carrier, are rotating.

In these cases, an oil transfer unit is generally provided to transfer the lubricant oil in an efficient and reliable manner from a static part to a rotating part connected to the carrier. Such oil transfer units are generally known as "oil transfer bearings" or as "rotary unions". In particular, the unit supplies oil under pressure into an annular chamber defined by a sleeve which is fixed to the carrier. From such annular chamber, the pressurized oil flows towards the components requiring lubrication.

The outer cylindrical surface of the sleeve has a radial passage arranged at the same axial position of the annular channel so as to put such channel into communication with the inner annular chamber. A minimum radial gap is provided between the inner cylindrical surfaces of the bearing and the outer cylindrical surface of the sleeve, to allow rotation of the sleeve and, in the meantime, to define a seal.

The amount of such radial gap is accurately determined in the design stage, so as to minimize leakages and therefore maximize the volumetric efficiency for the transfer of the oil. In the meantime, the mating cylindrical surfaces of the bearing and the sleeve have to be machined with a high precision level, to ensure the radial gap that has been defined at the design stage.

This kind of solution is particularly advantageous because it avoids the arrangement of contact bearings and contact sealing rings between the cylindrical surfaces of the bearing and the sleeve.

BRIEF DESCRIPTION

Possible axis misalignments and/or possible variations of relative position between the stationary part and the rotating part can occur during operation, because of mounting and/or manufacturing tolerances, of deformations under load due to torque transmission, of external loads, of differences in temperature between the start-up conditions and the running conditions, etc.

Such misalignments and position variations during operation may generate excessive friction and, therefore, seizing and/or excessive wear at the mating cylindrical surfaces that are moving one onto the other.

Therefore, a need is felt to improve the oil transfer units of known type, in order to have a higher floating degree for the bearing in relation to the position of the sleeve, to obtain a better compensation for misalignments and position variations and therefore to reduce wear and seizing risks.

Further needs are felt in this kind of solutions, such as limiting the weight of the components, simplifying the assembly operations, avoiding damages of the mating cylindrical surfaces of the bearing and the sleeve during such assembly operations, so as not to compromise the correct sealing during the operating conditions.

It is the object of the present invention to provide an oil transfer unit for transferring oil between a stationary part and a rotating part, which allows to meet the above mentioned needs in a simple and cost-effective manner.

According to the present invention, an oil transfer unit for transferring oil between a stationary part and a rotating part is provided, as defined in claim 1.

BRIEF DESCRIPTION OF THE DRAWINGS

The present invention will now be described with reference to the accompanying drawings, which show a non-limiting embodiment thereof, in which.

DETAILED DESCRIPTION

Figure 1:
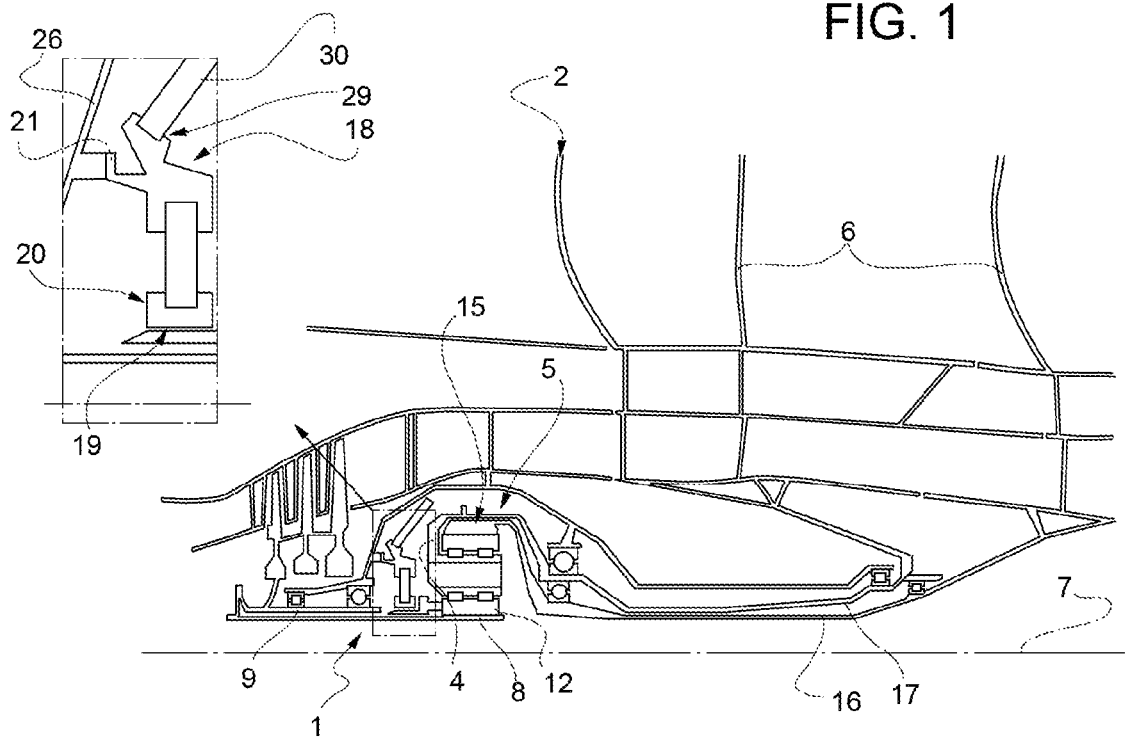
FIG. 1 is a diagram corresponding to a partial cross-section of a turbine engine, which includes an embodiment of the oil transfer unit for transferring oil between a stationary part and a rotating part, according to the present invention.

With reference to the diagram of FIG. 1, reference numeral 1 indicates an oil transfer unit for transferring oil between a stationary part and a rotating part. In this embodiment, unit 1 is mounted in a turbine engine 2 (partially and diagrammatically shown) and is used to supply lubricating oil towards a rotating planet carrier 4 defining part of an epicyclic transmission 5. In particular, the engine 2 shown in FIG. 1 is of the kind commonly known as "open rotor" and comprises two propellers 6 rotating in opposite directions about an axis 7.

Transmission 5 comprises a sun gear 8, which is rotational about axis 7 and is connected to an input shaft 9 so as to be driven by a turbine; a plurality of planet gears 12, which mesh with the sun gear 8, are supported by the carrier 4 and are rotational about respective axes, parallel and eccentric with respect to axis 7; and a ring gear 15, coaxial with the sun gear 8 and meshing with the planet gears 12 on the outer side.

Ring gear 15 and carrier 4 are connected in an angularly fixed manner to respective output members 16 and 17, which are coaxial with shaft 9 and drive corresponding propellers 6.

The particular differential configuration that has just been described for the epicyclic transmission 5 and the particular open rotor configuration that has been indicated for the engine 2 do not exclude the use of unit 1 according to the present invention for other kinds of epicyclic transmissions and/or engines, or for other kind of devices that need an oil supply. By way of example, unit 1 can be advantageously used to supply oil to rotating hydraulic actuators or systems, in particular to actuators controlled to adjust the pitch angle of the propeller blades (commonly known as PCM, i.e. pitch control mechanisms).

With reference to the diagrammatic enlarged view shown in FIG. 1, unit 1 comprises a stationary part 18, fixed with respect to a supporting structure of the engine 2; a rotating part 19, coaxial and angularly fixed with respect to the carrier 4; and a non-rotating floating part 20 which is configured so as to transfer oil from part 18 to part 19 and to have a certain degree of freedom in its movements with respect to part 18, as it will be described below in more detail.

As far as the support of part 18 is concerned, in an embodiment the latter is directly fixed to a so-called mid static frame 26, supporting the shaft 9 and the output members 16 and 17 by means of rolling bearings. In particular, part 18 comprises one or more flanges 21 bolted to frame 26.

Part 18 has an inner annular channel 28 (FIG. 8) and one or more inlet mouths 29, which receive pressurized oil from a hydraulic system 30 of the engine 2 and permanently communicate with channel 28 for supplying oil into such channel 28.

Figure 8:
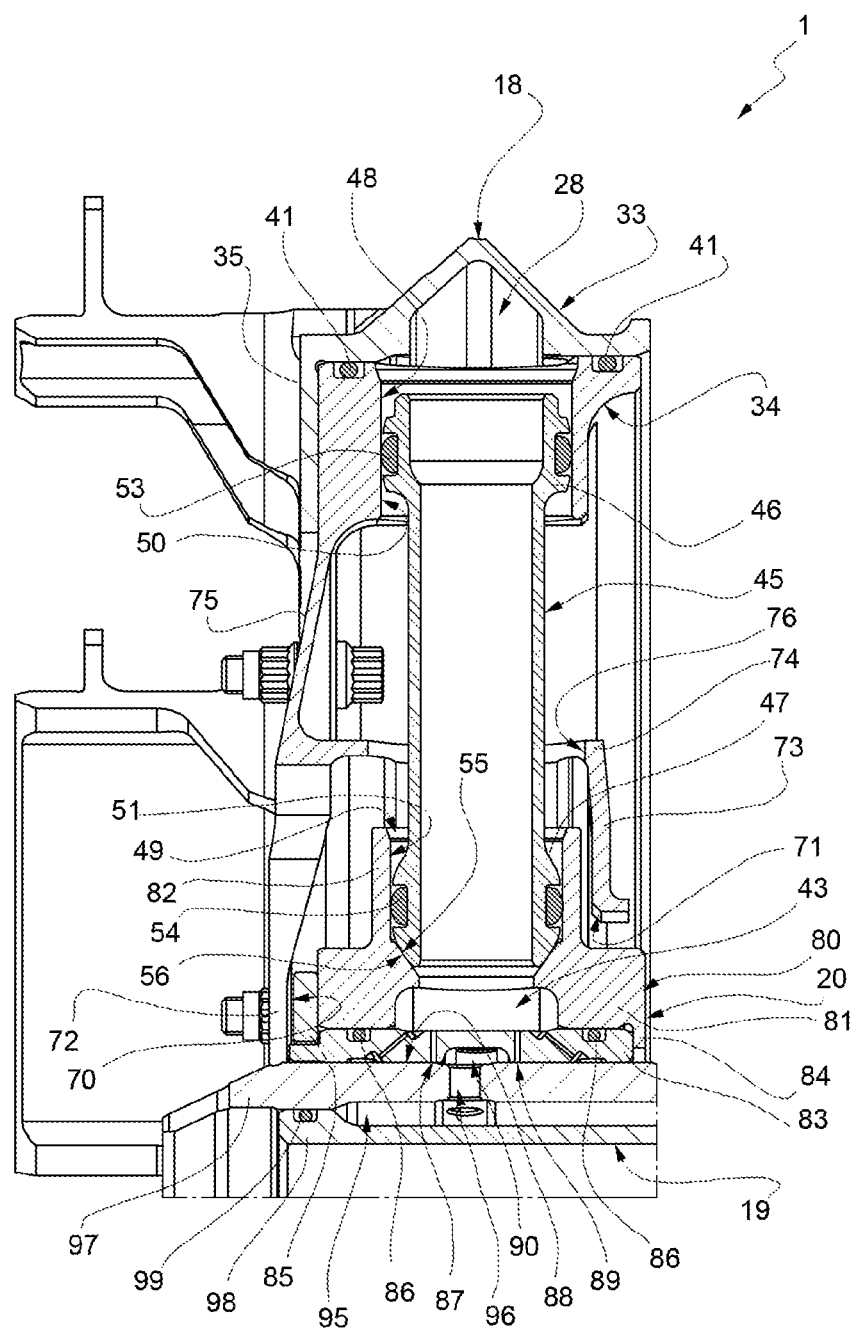
FIG. 8 is a cross-section, in an enlarged scale, according to the sectional plane VIII-VIII in FIG. 2.

With reference to FIG. 8, in an embodiment, part 18 comprises two annular elements 33 and 34, which are fixed to each other and are arranged respectively in a outer position and in an inner position with respect to axis 7. In particular, elements 33,34 comprise respective flanges 35 (FIG. 5) and 36 (FIG. 4), that are transversal to axis 7, axially rest against each other and are bolted to each other. As shown in FIG. 5, flanges 21 define parts of respective projections 37, that in embodiment protrude from flange 35 and are made in one piece with element 33. Besides, in particular, inlet mouths 29 are also defined by projections 38, that radially and outwardly protrude from element 33 and are made in one piece with element 33.

As shown in FIG. 8, elements 33 and 34 are coupled to each other by means of sealing rings 41, that are arranged on opposite axial sides of channel 28 to ensure fluid-tightness. Anyway, other kinds of construction (not shown) could be provided to define part 18. By way of example, part 18 could be manufactured in one piece by means of additive manufacturing techniques.

Channel 28 permanently communicates with an annular channel 43 of part 20 via one or more oil transfer tubes 45, each radially ending with two opposite heads 46,47. Head 46 is coupled in a fluid-tight manner to element 34, while head 47 is coupled in a fluid-tight manner to part 20. Heads 46 and 47 engage respective cylindrical seats 48 and 49 having respective cylindrical surfaces 50 and 51.

Figure 4:
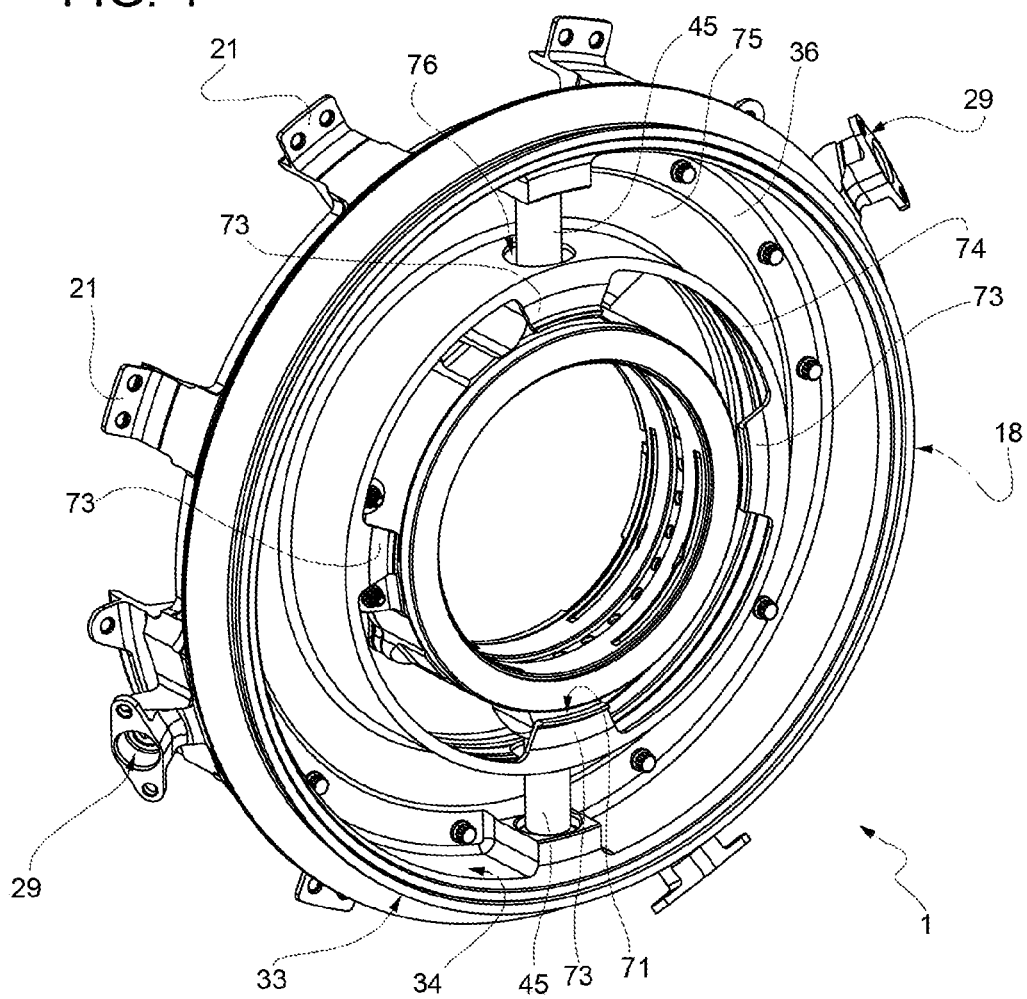
FIGS. 4 and 5 are different perspective views, at different scales, of other parts of the oil transfer unit.
Figure 5:
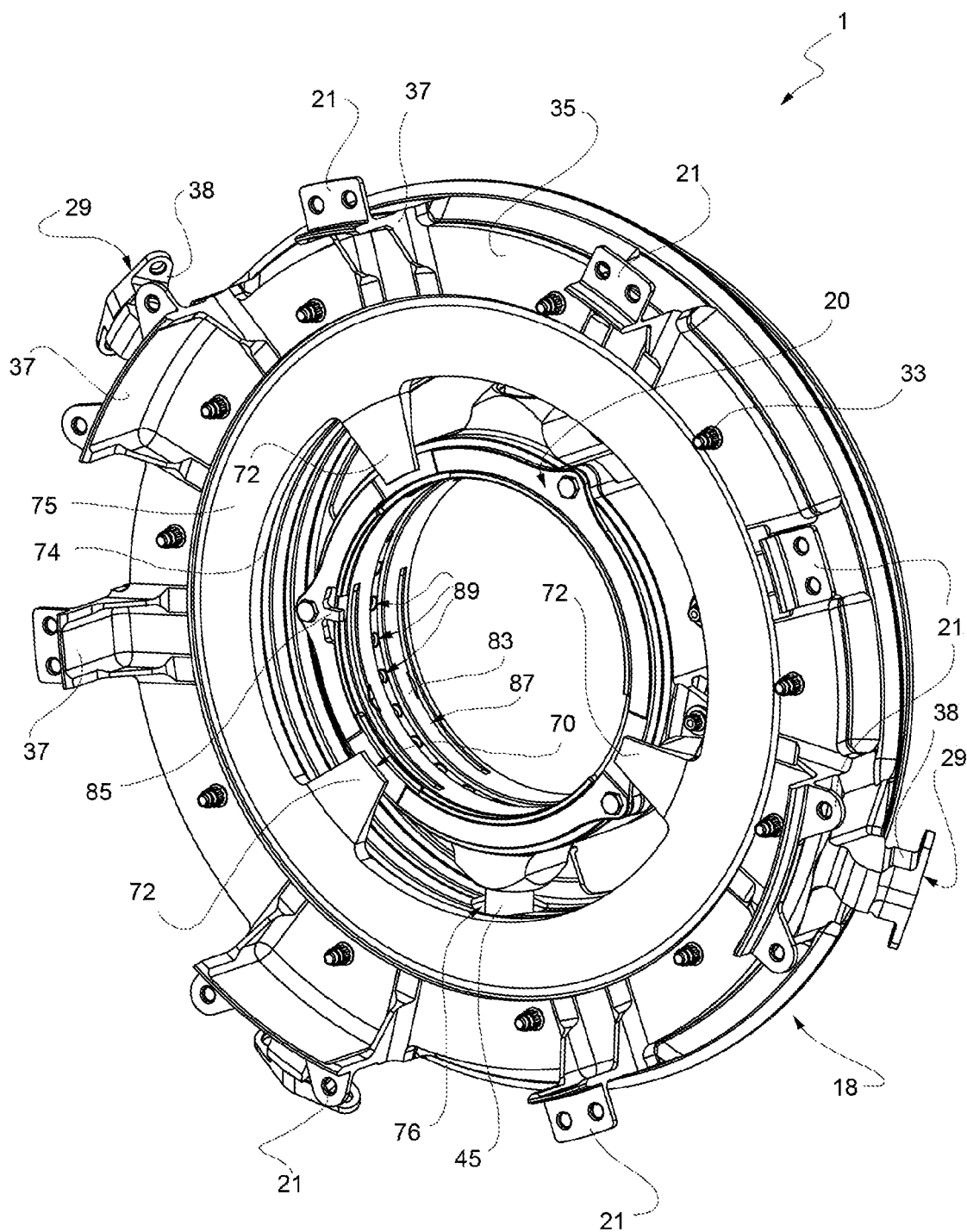

In embodiment, as shown in FIG. 4, unit 1 comprises only two tubes 45, arranged in diametrical opposite positions with respect to axis 7.

With reference again to FIG. 8, the outer side surfaces of heads 46 and 47 are coupled to the inner surfaces 50 and 51 by means of respective sealing rings 53,54 and in such a manner to give freedom for the tube 45 to slide along the axes of the seats 48,49. In addition, the outer side surfaces of heads 46 and 47 have respective diameters that are lower than the inner diameters of surfaces 50 and 51, so as to leave an annular gap between the heads 46,47 and the surfaces 50 and 51, in radial direction with respect to the axes of seats 48 and 49. Such gaps are closed by the sealing rings 53,54 and allow the tube 45 for a certain degree of freedom in rotation about a tangential direction with respect to parts 18 and 20.

The freedom of movements given to the tubes 45 allows the part 20 to float with respect to part 18, but does not compromise the sealing at the seats 48 and 49, as the sealing rings 53 and 54 elastically deform during such movements and continue to be in contact with surfaces 50,51.

According to an aspect of unit 1, the diameter of surface 50 is different from, in an embodiment higher than, the diameter of surface 51. Thanks to the oil pressure in the channels 28 and 43 and in the tubes 45, this difference in diameter generates a thrust on the tubes 45 towards part 20 and axis 7. In the meantime, seat 49 has a surface 55, joined to surface 51 and defining a stop shoulder for an end surface 56 of the head 47, which therefore permanently rests onto surface 55. The shapes of surfaces 55 and 56 are designed so as to define a contact at a circular theoretical line, for allowing rotation for the head 47 about the tangential direction with respect to part 20. By way of example, surface 55 is shaped as conical, and surface 56 is shaped as a spherical surface having a center that is arranged on the axis of tube 45.

In an embodiment, along the axis of the tube 45, such center is arranged at the mid-plane of the sealing ring 54, in order to minimize the reaction moment, generated by the elastic deformation of the seal, in presence of a misalignment of the tube 45 with respect to the floating part 20.

In an embodiment, sealing rings 53 and 54 are defined by respective so-called dynamic seals, which are designed so as to avoid leakage from tubes 45 when there is a strong misalignment and to have high resistance with respect to the continuous sliding on the inner surface of the tubes 45 in dynamic conditions.

In an embodiment, the shape of the outer profile in cross-section of the sealing rings 53 and 54 is trapezoidal or a D-shape, so as to avoid rubber seal spiral mode failures and rubber extrusion during the relative motion. Secondary, the above shape helps in obtaining an easier rotation of the heads 46,47.

Therefore, the sealing of each tube 45 at the seats 48 and 49 has features that allow wider movements for the part 18, in relation to the known prior art.

Figure 2:
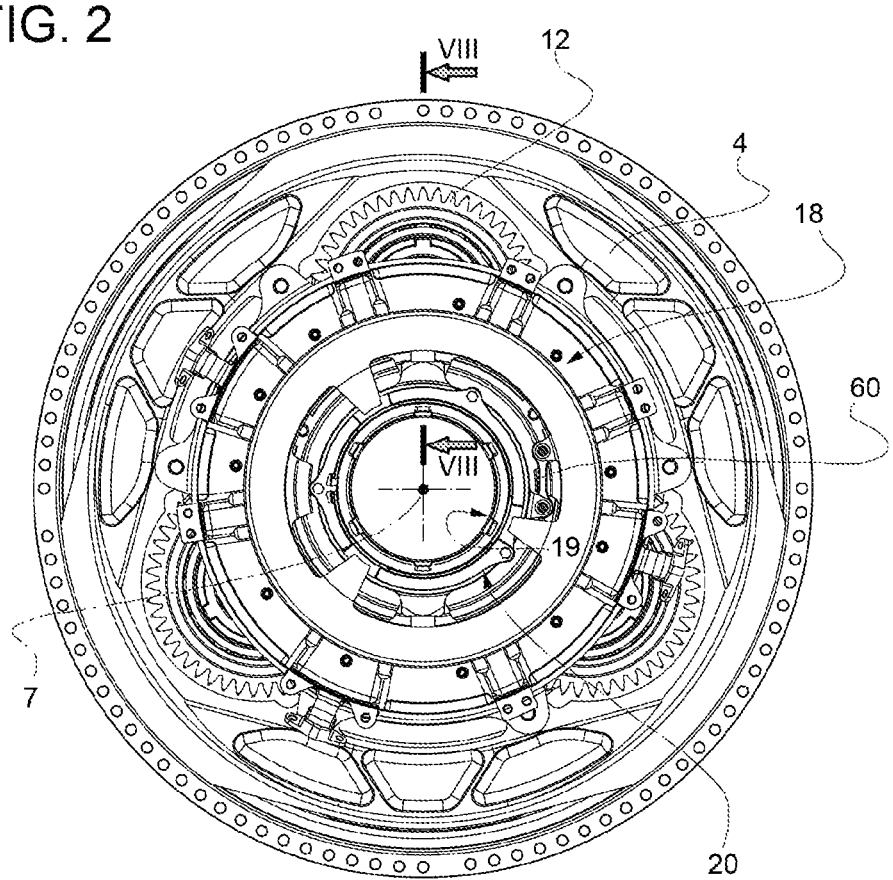
FIG. 2 is a front view of the oil transfer unit in FIG. 1.
Figure 6:
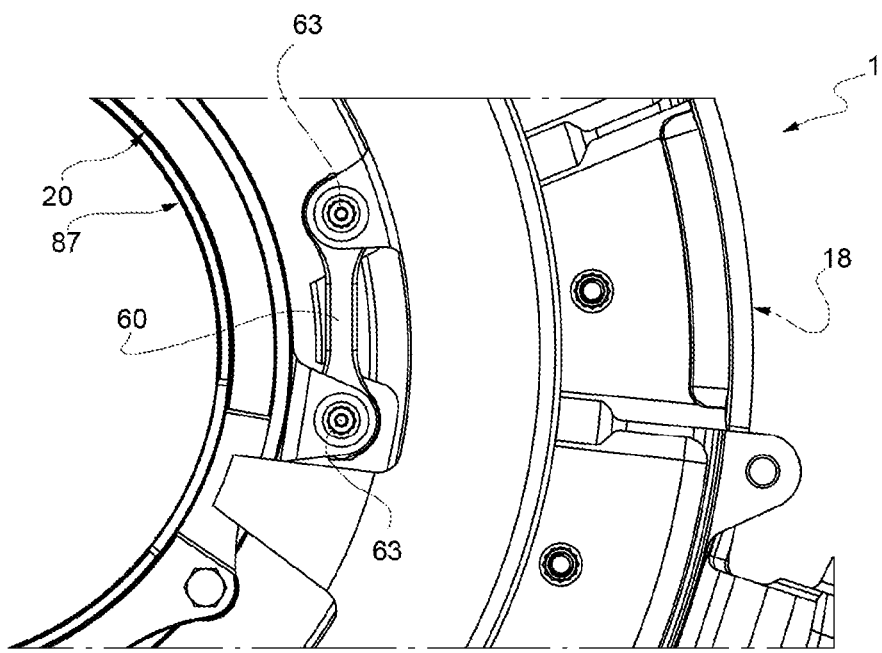
FIG. 6 shows a detail of FIG. 2, in an enlarged scale and with elements removed for sake of clarity.

As shown in FIGS. 2 and 6, rotation of part 20 about axis 7 is prevented by a connecting rod 60 having a rectilinear axis which extends in a tangential direction with respect to axis 7 when part 20 is arranged in a design reference position with respect to part 18.

In embodiment, the axis of the connecting rod 60 is arranged parallel to the tubes 45. This orientation allows to minimize the amplitude of the sliding and rotation movements of the heads 46,47 in the respective seats 48,49, for a given floating movement of part 20, so as to minimize the displacement and misalignment of the tubes 45 and, therefore, to minimize the risk of extrusion of the rubber seals (53 and 54).

Figure 7:
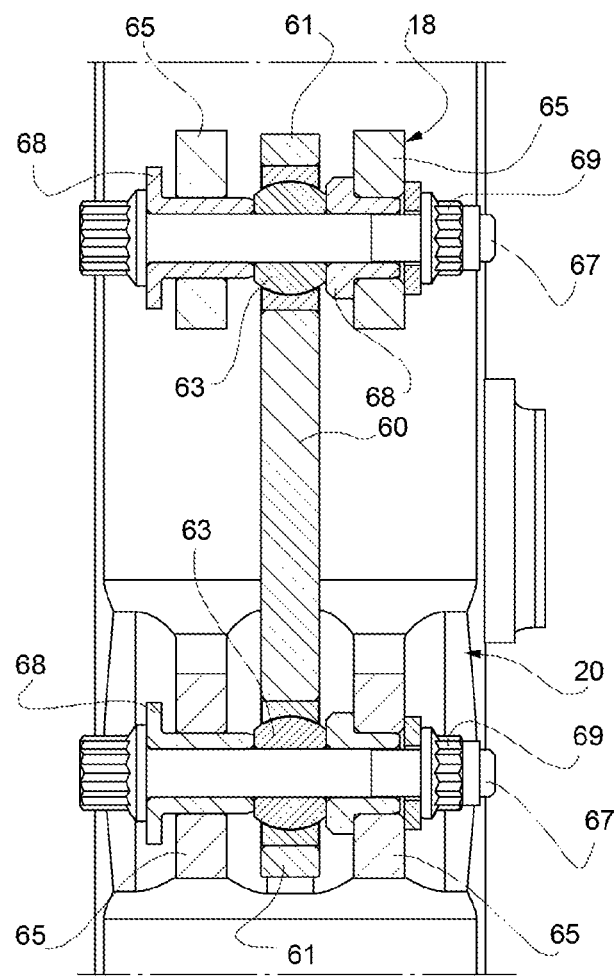
FIG. 7 is a cross-section, in an enlarged scale, according to the sectional plane VII-VII in FIG. 6.

The connecting rod 60 can be made of different pieces, fixed to each other, or can be made as a single piece. According to an aspect of the present invention, as shown in FIG. 7, the connecting rod 60 has two opposite ends 61, which are connected to part 18 and 20 by respective spherical joints 63. The provision of a spherical joint 63 at each end of the connecting rod 60 ensures a degree of freedom in axial translation for the part 20, with respect to axis 7, and not only a degree of freedom in rotation as in the prior art known from U.S. Pat. No. 8,813,469B2.

In particular, each of the ends 61, with its spherical joint 63, is arranged between two lugs 65 at a midplane of parts 18 and 20. The spherical joints 63 are mounted on respective threaded stems 67 which extend through the lugs 65 and are coupled to the latter in fixed positions by means of respective bushings 68 and respective screw nuts 69.

From the above features, it should be evident that every kind of movement is allowed for the part 20, apart from rotation about axis 7.

As an aspect of the present invention, with reference to FIGS. 4 and 5, the floating movement of part 20 is limited under a given range, established during the design stage, by the provision of shoulders 70,71 which are fixed with respect to part 18, are arranged on opposite axial sides of part 20 and axially face part 20. In an embodiment, shoulder 71 also radially faces part 20 (as it can be seen in FIG. 8).

Shoulders 70,71 are defined by respective series of tabs 72 and 73, which are spaced apart from each other about axis 7. In an embodiment, the angular positions of the tabs 72 are staggered with respect to the angular positions of the tabs 73 about axis 7, so as to allow installation of the connecting rod 60 by means of a combination of movements of the floating part 20. In particular, before installing the radial transfer tubes 45, an end of the connecting rod 61 is already mounted on element 34; afterwards, floating part 20 is axially moved, in relation to element 34, in such a way that the mid-plane of the connecting rod 61 is aligned with the mid-plane of the two lugs 65 provided on the floating part 20. In order to reach this alignment, the angular position of the floating part 20 has to be chosen so as to allow a free axial movement notwithstanding the tabs 72 and 73. Once the axial alignment is reached, a rotation of the floating part 20 is necessary to arrange the free end of the connecting rod 61 between the two lugs 65 provided on the floating part 20 and finally fix such end.

In an embodiment, tabs 72 and 73 project radially inward from opposite edges of a tubular ring 74, defining part of element 34. One of such edges is joined outwardly to flange 36 by an intermediate annular wall 75, in order to support the tabs 72,73. For each tube 45, the ring 74 has a corresponding radial passage 76 engaged by such tube 45.

When part 20 is arranged in the design reference position with respect to part 18, an axial gap and a radial gap are provided between the shoulders 70,71 and the part 20, so as to allow the desired floating movements established during the design stage and, therefore, to ensure the optimal operating condition of the unit 1. During assembly of unit 1, on the other hand, shoulders 70,71 can come into contact with part 20, radially and/or axially, so as to limit the relative movements between parts 18 and 20. In this way, the assembly of the unit parts and the mounting of unit 1 in the engine 2 are easier and safer, without risk of damages.

According to what shown as an embodiment in FIG. 8, part 20 comprises a main body 80, which in turn comprises an annular portion 81 defining the outer surface of channel 43; and, for each tube 45, a corresponding outer radial projection 82 defining seat 49. In particular, each of the projections 82 axially faces a corresponding tab 73.

Part 20 further comprises a bushing or annular pad 83, in an embodiment defined by a piece distinct and fixed with respect to body 80. In particular, pad 83 is axially sandwiched between a radial projection 84 of body 80 and a retaining ring 85, which axially rests onto, and is fixed to, body 80 on the opposite axial side of projection 84.

Pad 83 defines an inner surface of channel 43 and is coupled to body 80 by means of sealing rings 86 arranged on opposite axial sides of channel 43 to ensure fluid-tightness.

Pad 83 has a cylindrical surfaces 87 which directly faces and is fitted onto an outer cylindrical surface 88 of part 19 with a radial gap in a non-contact configuration, i.e. without any additional contact sealing element and any contact bearing therebetween. Pad 83 has one or more radial holes 89, putting channel 43 permanently into communication with an annular groove 90, which is delimited outwardly by the pad 83 and inwardly by the part 19 and axially splits surface 87 and/or surface 88 into two separated zones.

The size of the radial gap between surfaces 87,88 is defined during the design stage so as to allow rotation of part 19 and, in the meantime, define a hydrostatic seal with an oil film on each side of the groove 90 between surfaces 87,88 (i.e. at each of the two separated zones of the surfaces 87,88). Surfaces 87,88 have to be machined with a high level of precision and low tolerances in order to ensure both the rotation and the sealing conditions that have been defined during the design stage.

Part 19 has an inner annular chamber 95 and one or more radial holes 96, which are arranged at the same axial position of the groove 90 and put chamber 95 permanently into communication with the groove 90. Chamber 95, in turn, permanently communicates with one or more outlets (not shown) to supply oil to such outlets and, therefore, lubricate the gear meshes and/or the planet bearings.

In particular, chamber 95 is defined by an outer sleeve 97 and an inner sleeve 98, which are coupled to each other by means of sealing rings 99 (FIG. 8) to ensure fluid-tightness. By way of example, sleeves 97,98 are fixed to each other by screws (not shown).

Figure 3:
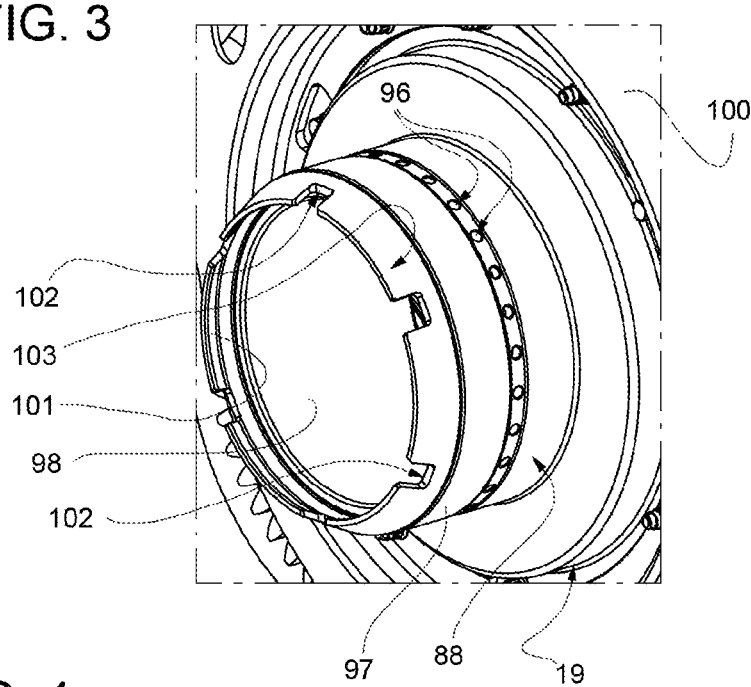
FIG. 3 shows, in a perspective view and in an enlarged scale, a rotating part of the oil transfer unit in FIG. 1.

As partially shown in FIG. 3, part 19 is fixed to the carrier 4 and, in particular, comprises a disk member 100 connecting sleeve 97 to a front surface of carrier 4. On the axial side opposite to member 100, part 19 ends with a front portion 101 having a plurality of axial notches 102, which start from the edge of portion 101, are angularly spaced along such edge and have the function of draining possible oil that could be trapped because of centrifugal forces.

In an embodiment, portion 101 is outwardly defined by a bevel or chamfer 103 joined to surface 88 and tapered towards the above mentioned edge to perform a leading function when part 20 is fitted onto part 19 and, therefore, simplify the assembly operations of unit 1.

From the above, the advantages of the unit 1 claimed and described with reference to the accompanying drawings should be evident.

In particular, no additional contact sealing elements are used at the interface between surfaces 87, 88 so that friction, consequent wear and the overall number of components are reduced. In addition, as mentioned above, the provision of spherical joints 63 at both ends of the connecting rod 60 allows the part 20 to float in every direction, apart from the tangential direction, so as to compensate for any kind of centering misalignment (due to manufacturing and mounting tolerances or errors, or due to deformations occurring during operation under load) between the stationary part 18 and the rotating part 19.

The amount of compensation is relatively high, also thanks to the features of the coupling features between the heads 46,47 and the seats 48,49, as explained above in greater detail.

A higher degree of compensation for tolerances, misalignments, errors, deformations, etc. permits to obtain optimal operating conditions and, therefore, a lower wear than in the prior art. This outcome means that oil leakage is relatively low at the interface between surfaces 87 and 88 and, furthermore, that unit 1 has a longer life time and/or can be used at higher rotational speeds. By way of example, according to preliminary tests and simulations that have been carried out, at the interface between surfaces 87,88 it is possible to reach speeds of 9 m/s and/or axial relative movements of 2 mm.

In the meantime, it is not necessary to provide a dedicated flexible support structure to mount unit 1 into the engine 2, so as to ensure the necessary axial floating of part 20, but it is possible to fit unit 1 directly to a rigid structure, just like frame 26. Indeed, the axial floating of part 20 is ensured by the spherical joints 63, i.e. an element that is just part of unit 1.

Notwithstanding the higher degree of floating given to part 20, the assembly operations are not compromised. Indeed, shoulders 70,71 define a useful limit in the range of movement of part 20 during the assembly stage and, therefore, simplify the assembly operations and help in avoiding possible damages to surfaces 87,88 during such operations. Also the configuration of portion 101 helps in simplifying the assembly operations and in avoiding damages to surfaces 87,88.

Furthermore, the claimed solution is rather compact and lightweight.

It is apparent from the above features and considerations that modifications or variants may be made to unit 1 without departing from the scope of protection as defined by the appended claims.

In particular, as mentioned above, unit 1 can be mounted to frame 26 and/or carrier 4 differently from what described above and/or can be used in applications different from epicyclic transmissions. Perhaps, in other applications, part 19 can have a sliding movement in addition to the rotational one, with respect to part 18. Besides, unit 1 could be even used to transfer oil from the rotating part 20 to the stationary part 18.

Furthermore, shape, number and/or configuration of the passages and conduits between the mouth 29 and the outlets could be different from what described with reference with the attached drawings.

The invention claimed is:
1. An oil transfer unit comprising:
a stationary part comprising an oil mouth;
a rotating part having an inner chamber and an outer cylindrical surface extending along an axis;
a floating part having a cylindrical surface fitted onto said outer cylindrical surface with a radial gap so as to define a non-contact configuration, the floating part axially movable with respect to the axis;
an annular groove defined by said rotating part and said floating part and permanently communicating with said oil mouth and with said inner chamber; said radial gap defining, in use, an oil film sealing each side of said groove;
at least one oil transfer tube ending with two opposite heads which are respectively coupled to said stationary part and said floating part in a fluid-tight manner, the oil transfer tube slidable and rotatable relative to the stationary part and the floating part;
a connecting rod having opposite ends which are respectively coupled to said stationary part and said floating part to prevent rotation of said floating part about said axis, wherein two spherical joints connect said ends respectively to said stationary part and said floating part.

2. The oil transfer unit according to claim 1, wherein said heads engage respective cylindrical seats having respective cylindrical surfaces, which are spaced apart from outer side surfaces of said heads and are coupled to said outer side surfaces in sliding manner and a fluid-tight manner by means of respective sealing rings.

3. The oil transfer unit according to claim 2, wherein the diameters of said cylindrical surfaces differ from each other; one of said seats having a stop shoulder for an end surface of the corresponding head; the shapes of said stop shoulder and said end surface being designed so as to define a contact at a circular line.

4. The oil transfer unit according to claim 3, wherein said end surface is shaped as a spherical surface having a center that is arranged on an the axis of said oil transfer tube.

5. The oil transfer unit according to claim 4, wherein said center is arranged at the centerline of the corresponding sealing ring.

6. The oil transfer unit according to anyone of claim 2, wherein the shape of the cross-section of said sealing rings is trapezoidal or is a D-shape.

7. The oil transfer unit according to claim 2, wherein the two opposite heads of the oil transfer tube define a tube diameter and the respective cylindrical seats define a seat diameter, and wherein the tube diameter is less than the seat diameter, thereby the oil transfer tube is slidable and rotatable relative to the stationary part and the floating part.

8. The oil transfer unit according to claim 1, further comprising a first and a second shoulder, which are fixed with respect to said stationary part, are arranged on opposite axial sides of said floating part and axially face said floating part.

9. The oil transfer unit according to claim 8, wherein said second shoulder radially faces said floating part.

10. The oil transfer unit according to claim 9, wherein said first and second shoulder are defined by respective series of tabs; the tabs of each series being spaced apart from each other about said axis.

11. The oil transfer unit according to claim 10, wherein said tabs project radially inward from opposite edges of a tubular ring, which has a radial passage engaged by said oil transfer tube.

12. The oil transfer unit according to claim 10, wherein the tabs of each series are angularly staggered with respect to the tabs of the other series about said axis.

13. The oil transfer unit according to claim 1, wherein said rotating part ends with a front portion outwardly defined by a chamfer which is joined to said outer cylindrical surface.

14. An oil transfer unit comprising:
a stationary part comprising an oil mouth;
a rotating part having an inner chamber and an outer cylindrical surface extending along an axis;

a floating part having a cylindrical surface fitted onto said outer cylindrical surface with a radial gap so as to define a non-contact configuration;

an annular groove defined by said rotating part and said floating part and permanently communicating with said oil mouth and with said inner chamber; said radial gap defining, in use, an oil film sealing each side of said groove;

at least one oil transfer tube ending with two opposite heads which are respectively coupled to said stationary part and said floating part in a fluid-tight manner and with freedom of movement;

a connecting rod having opposite ends which are respectively coupled to said stationary part and said floating part to prevent rotation of said floating part about said axis, wherein two spherical joints connect said ends of said connecting rod respectively to said stationary part and said floating part;

a first and a second shoulder fixed with respect to said stationary part and arranged on opposite axial sides of said floating part and axially face said floating part, wherein said second shoulder radially faces said floating part, wherein said first and second shoulder are defined by respective series of tabs, and wherein the tabs of each series are spaced apart from each other about said axis.

15. The oil transfer unit according to claim 14, wherein said tabs project radially inward from opposite edges of a tubular ring, which has a radial passage engaged by said oil transfer tube.

16. The oil transfer unit according to claim 14, wherein the tabs of each series are angularly staggered with respect to the tabs of the other series about said axis.

* * * * *